United States Patent [19]

Walton, Jr.

[11] 3,997,640
[45] Dec. 14, 1976

[54] METHOD OF FORMING A SILICON NITRIDE ARTICLE

[75] Inventor: Jesse D. Walton, Jr., Atlanta, Ga.

[73] Assignee: Ford Motor Company, Dearborn, Mich.

[22] Filed: Jan. 28, 1975

[21] Appl. No.: 544,718

[52] U.S. Cl. .................. 264/82; 264/63; 264/65; 264/86; 264/317; 264/DIG. 44
[51] Int. Cl.² .................. B28B 1/26; B29C 1/08
[58] Field of Search ............ 264/86, 63, 56, 221, 264/82, 317, DIG. 44, 65

[56] References Cited
UNITED STATES PATENTS

| | | | |
|---|---|---|---|
| 3,123,886 | 3/1964 | Miller | 264/221 |
| 3,445,250 | 5/1969 | Preece | 264/63 |
| 3,494,997 | 2/1970 | Dittrich | 264/221 |
| 3,885,005 | 5/1975 | Downing | 264/65 |
| 3,887,411 | 6/1975 | Goodyear | 264/65 |

OTHER PUBLICATIONS

Cottrell, *An Introduction to Metallurgy*, pp. 184–185 (1967).

*Primary Examiner*—Robert F. White
*Assistant Examiner*—John Parrish
*Attorney, Agent, or Firm*—William E. Johnson; Keith L. Zerschling

[57] ABSTRACT

A method of forming an article of silicon nitride is disclosed. A complex shape of an article is formed in a molding material which may be liquified by heating. A porous shell is formed about the shaped molding material with a refractory ceramic material which loses its structural strength when heated to a high temperature. The molding material is removed from the porous shell and a silicon metal slip is cast into the vacated volume. The silicon metal of the slip is nitrided at a temperature which is also effective to destroy any structural strength of the refractory ceramic material forming the porous shell. The weakened porous shell is removed from the nitrided article to produce the final article.

7 Claims, 7 Drawing Figures

METHOD OF FORMING A SILICON NITRIDE ARTICLE

BACKGROUND OF THE INVENTION

The prior art teaches a method of forming a shape of an article by casting a slip of silicon metal particles suspended in a vehicle into a porous mold. The porosity of the mold permits the vehicle of the slip to flow out of the mold leaving behind a compacted mass of silicon metal particles. The compacted particles are dried and removed from the mold to produce a shape formed of closely packed silicon metal particles. This shape is a green body of silicon metal particles having a very low level of strength. The green body is placed in a furnace and treated at high temperatures with nitrogen gas to produce a final article of silicon nitride having substantial strength.

Difficulty has been encountered in moving the green body from the molding step to the nitriding step. Since the green body lacks any substantial strength, it is easily damaged.

It is an object of this invention to provide a method of nitriding a slip cast article such that the mold in which the article is formed also forms a support for the article during drying, transfer, and nitriding. It is a further object of this invention to provide a method of forming a silicon nitride article as above-described in which a porous shell mold forming the support for the green body loses its structural strength during the nitriding of the silicon metal particles so that the mold can be removed from the article after nitriding without damage to the article.

SUMMARY OF THE INVENTION

This invention relates to a method of forming a silicon nitride article and, more particularly, to a method of forming a silicon nitride article by a slip casting operation and thereafter supporting the green body by the mold in which it has been cast.

In accordance with the teachings of this invention, an article of silicon nitride is formed in the following manner. A complex shape for the article is formed in a molding material which liquifies upon heating. A porous shell is formed about the shaped molding material by a refractory ceramic material which loses its structural strength when heated to a high temperature. The shaped molding material is removed from the interior of the porous shell by liquifying the molding material at an elevated temperature. A silicon metal slip is cast into the volume within the interior of the porous shell created by removal of the molding material. The porous shell and silicon metal deposited therein by the slip casting operation is dried. On drying, the silicon metal contained within the shell is nitrided in a nitrogen atmosphere heated to a nitriding temperature. The nitriding temperature is also sufficient to cause the porous shell to lose its structural strength. The porous shell of weakened structural strength is removed from the nitrided article in order to produce the final article of silicon nitride.

BRIEF DESCRIPTION OF THE DRAWING

The drawing contains seven figures which represent individual processing steps used in the method of this invention to produce a silicon nitride article.

DESCRIPTION OF THE PREFERRED EMBODIMENT

This application teaches a method of making a silicon nitride article in which the article is initially formed by slip casting silicon metal particles in a mold and subsequently nitriding these particles within the mold to produce the article.

Figure 1:
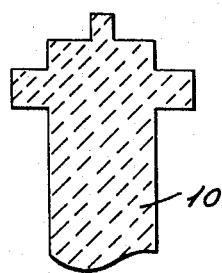

As shown in FIG. 1, the method of this invention is initiated by forming the complex shape of an article by a molding material to produce a mold pattern 10. In particular, the mold pattern may be made out of any molding material which is liquifiable at a reasonable temperature. Molding waxes having both low coefficients of thermal expansion and liquifiable at temperatures below 150° F. are desirable for forming the mold pattern. Such waxes are well known in the art. The wax is cast into a suitable mold (not shown) to produce the final mold pattern.

Figure 2:
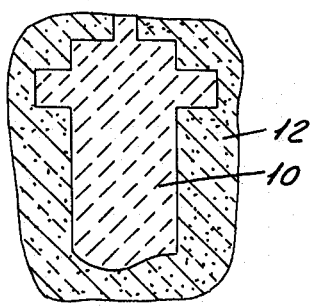

As shown in FIG. 2, the next step of the method involves the formation of a porous shell 12 about the mold pattern 10. The porous shell may be formed of many types of refractory ceramic materials such as for example, fused silica, zircon, silicon carbide and alumina. The porous shell is built-up on the mold pattern to a thickness in a range of from about 1/16 to about ⅛ inch.

A required characteristic of the refractory material forming the porous shell 12 is that it has a structural strength at a low temperature capable of supporting itself and any material contained therewithin, but also have that structural strength destroyed when the shell is heated to a high temperature. One way of accomplishing the change in structural strength of a refractory material is to select a material such as fused silica which devitrifies upon heating to high temperatures. Another way is to select a ceramic material and a binder therefor, the binder being destroyed during the high temperature operation leaving behind only the refractory material of low structural strength.

In order to illustrate a preferred embodiment of this invention, the porous shell described is made of finely divided fused silica. The porous shell is built-up by several repetitions of a two step process. The first step in the process is to form a slurry of about 80 to 90 volume percent of fine fushed silica powder in water with a very small amount of a wetting agent such as ultrawet 60 (Arco Chemical Division, Atlantic Richfield Company). The mold pattern 10 is dipped in this slurry and withdrawn. The size of the fine powder making up the slurry is generally in the range of about 200 mesh. When the dipped article is withdrawn from the slurry it is dried for a short time to set up the material then a second step is undertaken. In the second step fine, dry fused silica grain, generally having a size of about 80 mesh, is applied. This material is applied by dipping the article in a fluidized bed of material or by sprinkling the material on the layer of material remaining after the dipping step.

After the second step, the article with its coating thereon is alternately dipped in the fine slurry of powder and then the dry material. Approximately two to six cycles of this procedure are used to build up the desired thickness for the shell. Between each two step cycle, approximately 4 hours is allowed for drying the applied material. This porous shell 12 built-up on the mold pattern 10 must be sufficiently porous that a slip casting operation can take place therein. In other words, the shell must be sufficiently porous that the vehicle of a casting slip can be removed therefrom without damage to the shell.

Figure 3:
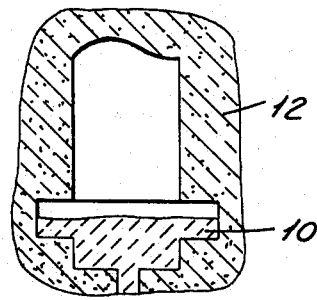

With reference to FIG. 3, the next step in the method of this invention is illustrated. In this step, the wax mold pattern 10 is removed from the porous shell 12. One manner of removing the wax pattern is as follows. The mold pattern and encompassing shell are placed in a high temperature oven operating at 1500° F. The heat of the oven penetrates rapidly through the porous shell and attacks the layer of wax immediately adjacent the shell causing it to burn off. One may visually observe a flame coming from the article. This burning action results in about 20 seconds and it is carried out so that the wax does not expand under slow heating conditions causing the shell to crack. After this burning action, the enclosed pattern and shell 12 are transferred to a dryer having a temperature below the flame point of the wax. For example, the article may be placed in a furnace having a temperature of about 450° F for about 10 minutes. This longer heating action allows the wax to melt and drain from the porous shell 12. The shell 12 is then returned to the high temperature oven at about 1500° F for 10 to 20 minutes in order to burn out the remainder of the wax which is generally held in the pores of the porous shell.

Figure 4:
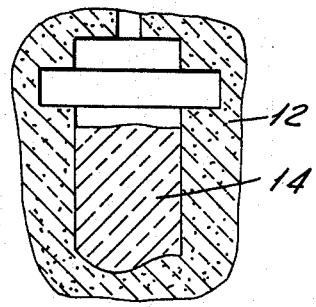

With reference to FIG. 4, the porous shell 12 is used as a casting mold to receive a silicon metal slip 14 therein. Slip casting of such a material is well known in the art. One forms a slurry of silicon metal particles in a vehicle such as water. The slip is poured into the porous mold 12, the porosity of the mold allowing the vehicle to escape leaving behind finely packed silicon metal particles in the shape of the article. Vibration, vacuum and other known techniques can be applied to the porous shell 12 during its filling in order to insure that the mold is filled with dense, highly packed silicon metal particles. Once the shell is filled with silicon particles, 24 hours of drying time at room temperature is desired in order to permit removal of all the vehicle from the casting. Additionally one may, if desired, heat the material contained within the porous shell to a temperature of 105° F for 4 hours and additionally to 300° F for another 4 hours to insure complete drying.

Figure 5:
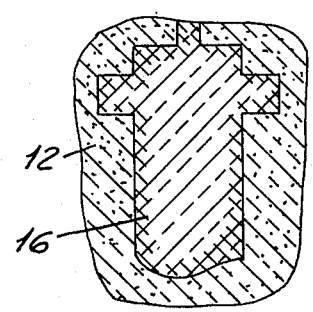

With reference to FIG. 5, the next step of the method of this invention is illustrated. In this particular step, the porous shell 12 and the silicon metal particle forming an article 16 to be manufactured are placed in a nitriding furnace. The furnace is used to heat the article to a temperature at which nitriding takes place. Although many nitriding cycles are known, most of them operate at a temperature below the melting point of silicon for a period of time and then at a temperature above the melting point of silicon for a period of time. This dual temperature schedule allows the formation of some silicon nitride at a temperature below the melting point of the silicon metal, which material provides the strength for the entire article when the article is heated to a temperature above the melting point of silicon. At the initiation of the nitriding cycle, a nitriding furnace is evacuated and back filled with nitrogen to a level of 1 to 2 inches of water. The article is then heated at a rate of 300° F per hour to a temperature of 2350° F, while a nitrogen atmosphere is maintained. The temperature of 2350° F is held for a period of about 35 hours after which the temperature is raised to 2600° F for an additional period of about 24 hours. This action permits the nitrogen to permeate the porous shell and react with the silicon metal particles forming the article 16 to produce silicon nitride. After this nitriding cycle, the furnace is cooled back to room temperature at a rate of about 300° F per hour.

Figure 6:
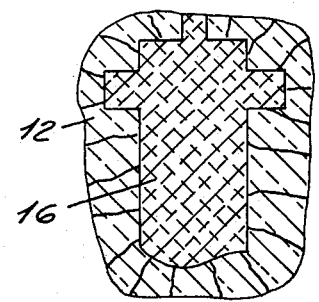

The next step of the method of this invention is illustrated in FIG. 6. In the particular embodiment illustrated herein, fused silica was used to form the porous shell 12. Fused silica devitrifies when it is heated to a temperature above 2250° F for several hours. Under such devitrification conditions, the shell mold 12 cracks apart during the cooling thereof back to room temperature.

Figure 7:
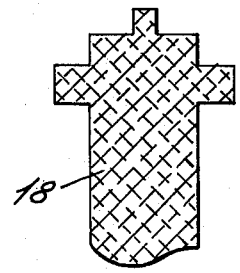

The final step of the method is illustrated in FIG. 7. In this figure, a completed silicon nitride article 18 is shown. This article is achieved by removing the devitrified mold 12 from the article which was nitrided. The removal of the mold is a relatively easy matter as it has been structurally weakened by its devitrification. The mold may be removed by breaking it apart of by applying a light shot peening operation thereagainst.

There has been disclosed herein a method of forming silicon nitride into complex shapes. In view of this specification, those skilled in the art will have many modifications thereof which fall within the true spirit and scope hereof. It is intended that all such modifications be included within the scope of the appended claims.

I claim:

1. A method of forming an article of silicon nitride which comprises:
    forming the shape of the article in a molding material, which molding material may be liquified;
    forming a porous shell about said shaped molding material with a refractory ceramic material which loses its structural strength when heated;
    removing said shaped molding material from the interior of said porous shell by liquifying said molding material;
    casting a silicon metal slip into said porous shell to fill the volume created by removal of said molding material;
    drying said porous shell and said silicon metal deposited therein by said slip casting step;
    nitriding the silicon metal contained within said porous shell by heating said contained silicon metal in a nitrogen atmosphere to a temperature sufficient to allow the nitriding action, said nitriding temperature being sufficient to cause said porous shell to lose its structural strength and
    removing said porous shell of weakened structural strength to produce the article of silicon nitride.

2. A method of forming an article of silicon nitride which comprises:
    forming the complex shape of the article with wax which may be liquified at a temperature below 200° F;
    forming a porous shell about said shaped wax with a refractory ceramic material which devitrifies;
    removing said shaped wax from the interior of said porous shell by liquifying said wax;
    casting a silicon metal slip into said porous shell to fill the volume created by removal of said wax;
    drying said porous shell and said silicon metal deposited therein by said slip casting step;
    nitriding the silicon metal contained within said porous shell by heating said contained silicon metal in a nitrogen atmosphere to a temperature sufficient to allow the nitriding action, said nitriding temperature also being sufficient to cause said porous shell to devitrify and lose its structural strength; and removing said devitrified porous shell to produce the article of silicon nitride.

3. The method of claim 1 wherein said refractory ceramic material is a fused silica.

4. The method of forming silicon nitride article as defined in claim 2 wherein said wax is removed from said porous shell by initially heating the confined wax at a temperature which burns away the layer of wax closely adjacent the interior surface of the shell, then heating at a temperature below the flash point of the wax for a period of time to remove substantially all the wax from the mold, and once again heating at a temperature to insure that all of the wax is burned out of the pores of the porous shell.

5. The method of forming an article of silicon nitride as defined in claim 2 wherein said slip within said porous shell is dried at least 24 hours at room temperature prior to the nitriding step.

6. The method of producing an article of silicon nitride as defined in claim 2 wherein said nitriding operation is carried out by heating said silicon metal in a nitrogen atmosphere from room temperature to a temperature of 2350° F, holding the article at 2350° F for a period of about 36 hours, and then raising the temperature to 2600° F for an additional 24 hours, all while maintaining a nitrogen environment.

7. The method of claim 6 wherein said porous shell and silicon metal contained therewithin are heated to nitriding temperatures and cooled therefrom to room temperature at a rate of about 300° F per hour.

* * * * *